June 7, 1960   H. H. HILL   2,939,466
PIPE LINE WASHING SYSTEM
Filed Oct. 29, 1957
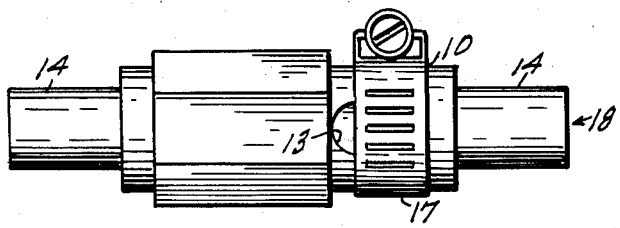
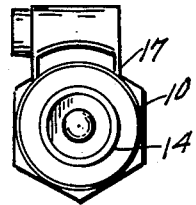
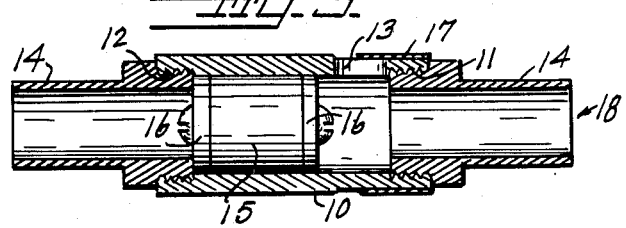
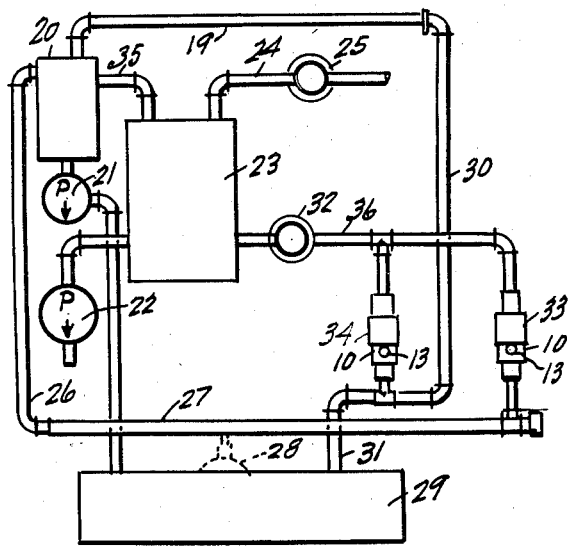
INVENTOR.
Henry H. Hill
BY Philip A. Friedell
Attorney United States Patent Office 2,939,466
Patented June 7, 1960

2,939,466
PIPE LINE WASHING SYSTEM

Henry H. Hill, Yreka, Calif., assignor to Rockwood & Co., Chicago, Ill., a corporation of Delaware Filed Oct. 29, 1957, Ser. No. 693,065

1 Claim. (Cl. 134—169)

This invention relates to improvements in a pipe line washing system, and provides a valve which is of the simplest possible construction with an absolute minimum number of parts, and which will operate under a very slight differential in pressures, and through adaptable for other uses and installations, the valve is particularly designed for use in connection with milk line washing systems where the wash solution is drawn into the lines and subjected alternately to subatmospheric and atmospheric pressures to create reciprocating motion coupled with bubbling and foaming of the wash solution within the milk lines.

The objects and advantages of the invention are as follows:

First, to provide a differential valve for alternately subjecting a pipe line to two different pressures.

Second, to provide a valve as outlined, alternate pressures in one line contra to alternate pressures set up in another line being controlled by a vacuum make-and-break device.

Third, to provide a valve as outlined with an atmospheric air intake including means for adjusting the area thereof for controlled admission of air.

Fourth, to provide a valve as outlined of the simplest possible construction, positive in action, and economical to produce.

Fifth, to provide a washing system for a pipe line in which a differential valve of the type outlined causes alternate atmospheric and subatmospheric pressures to create reciprocating motion coupled with bubbling and foaming of the wash solution within the pipe line for efficient cleansing.

In describing the invention reference will be had to the accompanying drawings, in which:

Fig. 1 is a side view of the invention showing the air intake passage and its area adjusting means.

Fig. 2 is an end view of Fig. 1.

Fig. 3 is a longitudinal section through the invention.

Fig. 4 is a diagrammatic view of a washing system for milking lines and indicating one use for the invention.

The invention consists of a cylinder 10 which is internally threaded at each end as indicated at 11 and 12 and having a radial intake passage 13 formed through the wall of the cylinder adjacent one end.

A nipple 14 is screwed into each end of the cylinder, the two nipples being identical, and both shown to receive a flexible tube, though they can be a arranged for threaded pipe, not shown. A free piston 15 provided with sealing means such as cup leathers 16 is slidable in the cylinder, and is readily moved from one position to the other with but a fraction of an ounce differential, for which reason the adjustable collar 17 is provided, to adjust the intake passage in conformity with the degree of vacuum normally existent in the nipple 18 when the inlet 13 is closed by the piston, the greater the vacuum, the greater the area of free passage through the inlet.

To illustrate the use and operation of the invention, a diagram of a milking and washing system is provided, 19 being the milking line, 20 the separator, 21 the milk pump which normally discharges to a storage tank (not shown), 22 being the vacuum pump, 23 the vacuum tank, 24 the pulsator line having a pulsator 25, 26 the washing line connected to a manifold 27 to which the milking machines 28 are attached and through which the washing solution is drawn from the wash tank 29. Another washing line 30 is connected to the terminal end of the milking line and receives wash solution direct from the wash tank as indicated at 31. The lines 26 and 30 are attached to the milking system only for the washing operation and do not form a part of the milking system.

As so far described, the wash solution would merely be sucked up into the lines by the vacuum set up by the vacuum pump 22 and would merely drain out if the pump was stopped. Such washing would be very inefficient, therefore one of the valves shown in Fig. 1 is connected through a pulsator 32 between the terminal end of the manifold 27 and the vacuum tank 23, the differential valve being shown at 33. A second valve 34 is connected from the pulsator 32 to the wash line 30, the two valves providing for greater efficiency in washing than if line 30 was connected to the manifold 27.

With the vacuum pump 22 in operation, a vacuum is set up in the tank 23, which, through the connection 35, draws solution through line 30 and milking line 19, and through the milking units 28, manifold 27, and line 26, into the separator 20, the pump 21 discharging the solution back to the solution tank 29. However, the pulsator 32 is also under the same subatmospheric pressure and operates continuously at a predetermined speed which may be any desired cycle of one-half second or more. Each time that the vacuum is completed in the line 36, the piston 16 is drawn up to the top of the cylinder as indicated in Fig. 3, instantly opening the intake 13, admitting air to the line 30 and manifold 27, which allows part of the solution to drain back to the tank and the rest to drain backward only partly, at the same time passing air through the solution to cause bubbling and frothing. When the pulsator moves in the opposite direction, air is admitted through the connection 36, breaking the vacuum to the top of the cylinder, allowing the piston to drop augmented by the partial vacuum existent in the nipple 18. This closes off the air through the inlet 13, completing the vacuum in the lines 26 and 30, drawing in more solution.

Thus this valve provides for the highest efficiency in washing of pipe lines, and though illustrated as being mounted vertically in the diagram, the valve will operate in any position, since only a very slight differential in pressures will operate the piston.

I claim:

A washing system for a pipe line comprising, a solution tank, a washing line connected from said pipe line to said solution tank, a source of subatmospheric pressure in communication with said pipe line, a pulsator, a connection from said source of subatmospheric pressure to said pulsator for actuation thereof, a differential valve having a first connection to said pulsator and a second connection to said washing line, said differential valve comprising a cylinder, a connection for each end of the cylinder for said first and second connections, a free piston slidable in said cylinder, said connections for the respective ends of the cylinder coincidentally forming stops for limiting the travel of the piston, said cylinder having an air inlet passage adjacent one end open to atmosphere when said piston is retracted through subatmospheric pressure set up in said first connection to admit air under atmospheric pressure to said washing line to partly release solution for return to the tank and create frothing and bubbling in the pipe line, said air inlet passage being closed to restore the washing line and pipe line to subatmospheric pressure to draw in additional solution when said first connection is subjected to atmospheric pressure by said pulsator and the washing line is restored to subatmospheric pressure to move the piston to air inlet passage closing position.

References Cited in the file of this patent
UNITED STATES PATENTS

| | | |
|---|---|---|
| 891,808 | Adams | June 30, 1908 |
| 2,020,773 | Ernst | Nov. 13, 1935 |
| 2,233,852 | Schmitt | Mar. 4, 1941 |
| 2,278,249 | Davis | Mar. 31, 1942 |
| 2,791,227 | Holmstrom | May 7, 1957 |